United States Patent [19]

Swift et al.

[11] 4,228,036

[45] Oct. 14, 1980

[54] ALUMINA-ALUMINUM PHOSPHATE-SILICA-ZEOLITE CATALYST

[75] Inventors: Harold E. Swift, Gibsonia; John J. Stanulonis, Pittsburgh; Elizabeth H. Reynolds, Verona, all of Pa.

[73] Assignee: Gulf Research & Development Company, Pittsburgh, Pa.

[21] Appl. No.: 49,358

[22] Filed: Jun. 18, 1979

Related U.S. Application Data

[63] Continuation-in-part of Ser. No. 926,886, Jul. 21, 1978, Pat. No. 4,158,621.

[51] Int. Cl.$^2$ ............................................. B01J 27/14
[52] U.S. Cl. ...................................... 252/437; 252/435
[58] Field of Search ................................ 252/435, 437

[56] References Cited

U.S. PATENT DOCUMENTS

| | | | |
|---|---|---|---|
| 3,213,035 | 10/1965 | Morrell | 252/435 |
| 3,271,299 | 9/1966 | Kearby | 252/437 X |
| 3,342,750 | 9/1967 | Kearby | 252/437 |
| 3,904,550 | 9/1975 | Pine | 252/437 |
| 3,944,482 | 3/1976 | Mitchell et al. | 208/120 |
| 4,128,592 | 12/1978 | Koeding | 252/435 X |

*Primary Examiner*—Delbert E. Gantz
*Assistant Examiner*—William G. Wright

[57] ABSTRACT

A catalyst for cracking gasoline feedstock with greater selectivity to gasoline production and greater metals tolerance comprising an alumina-aluminum phosphate-silica matrix composited with a zeolite having cracking activity.

8 Claims, No Drawings

ALUMINA-ALUMINUM PHOSPHATE-SILICA-ZEOLITE CATALYST

This application is a continuation-in-part application of our Application Ser. No. 926,886, filed July 21, 1978 now U.S. Pat. No. 4,158,621 for A Process For Increasing Gasoline Yield and Quality During Catalytic Cracking of High Metals Content Charge Stocks Using An Alumina-Aluminum Phosphate-Silica-Zeolite Catalyst.

BACKGROUND OF THE INVENTION

1. Field of the Invention

The present invention resides in a catalyst comprising a zeolite dispersed in an alumina-aluminum phosphate-silica matrix suitable for use in a process for increasing gasoline yield and quality.

Around the turn of the century, motor vehicles in the United States began to appear in increasing numbers and gasoline obtained a degree of marketable value as a refinery product. Shortly thereafter, demand in the United States for motor fuels began to exceed the amount produced from refinery crude-oil runs geared for producing kerosene, fuel oils, etc., which were very much in demand at the time. Since then the petroleum industry's most prominent problem has been inventing new and more efficient methods to meet the tremendous demand for gasoline without overproducing other petroleum products at the same time.

Due to the continually increasing demand for gasoline and the ever-shrinking supplies of crude cracking stocks, such as gas oils and the like, more attention has recently been directed to the catalytic cracking of heavier charge stocks such as petroleum residuals. These charge stocks, however, suffer from the disadvantage of having high metals content which is concentrated therein during a normal cracking process. The metals tend to deposit on catalysts and decrease the cracking characteristics thereof in a cracking process. The novel catalysts defined and claimed herein are particularly formulated to increase the gasoline yield and quality (i.e., BTX) from gas oils during a cracking process and additionally to catalytically crack petroleum residuals with high selectivity to gasoline production as well as having improved metals tolerant characteristics. Examples of typical metals which can be present during the cracking process include the following: nickel, vanadium, copper, chromium and iron.

2. Description of the Prior Art

The use of zeolitic cracking catalysts has become of increased importance in petroleum cracking processes due to the higher activity characteristics of these catalysts (see "Recycle Rates Reflect FCC Advances", by J. A. Montgomery, Oil & Gas Journal, Dec. 11, 1972, pp 81–86).

Several processes have been proposed in the past wherein zeolite catalysts are utilized to crack crude oils and petroleum residual feedstocks. One such process is set forth in U.S. Pat. No. 3,944,482; entitled "Process for the Cracking of High Metals Content Feedstocks", issued to Mitchell et al, on Mar. 16, 1976. The reference discloses the use of a zeolite catalyst dispersed with a large pore matrix, for example, alumina, alumina silicate clay, etc., in a process to crack high metals content feedstocks. Although zeolites are disclosed, the particular combination of zeolite composited with an alumina-aluminum phosphate-silica matrix, as specifically defined herein, to increase gasoline production in a cracking process is not appreciated.

U.S. Pat. No. 3,835,032, entitled "Catalytic Cracking with Silver-Rare Earth or Copper-Rare Earth Exchanged Y-Type Zeolite", issued to Dolbear et al, on Sept. 10, 1974, relates to a zeolite hydrocarbon cracking catalyst which consists of synthetic Y-type zeolite exchanged with silver or copper ions in combination with rare earth ions. The exchanged zeolite is combined with an inorganic oxide matrix, for example, inorganic hydrogels, such as silica, alumina and silica-alumina hydrogel. These catalysts are described as capable of producing a high yield of aromatic gasoline fractions of enhanced octane rating.

Another hydrocarbon cracking zeolite catalyst is disclosed in U.S. Pat. No. 3,985,640, entitled "Cracking with Zeolite Catalysts Promoted with Uranium or Uranium Plus Silver", issued to Lussier et al, on Oct. 12, 1976. Particularly, the reference relates to zeolite promoted hydrocracking catalysts consisting of a type X or Y faujasite zeolite exchanged with uranium or uranium in combination with silver ions dispersed on a kaolin clay, amorphous silica alumina matrix. The catalyst is said to be highly active and selective for the production of gasoline from gas oils.

High surface area aluminum phosphate gels, methods of making and using them as catalysts or catalyst supports are disclosed in U.S. Pat. No. 3,342,750; entitled "Compositions Containing Stable Aluminum Phosphate Gel and Methods of Making and Using Same; issued to Kearby, on Sept. 19, 1967. In particular, the reference relates to the preparation of aluminum phosphate gels, in a preferred mode, by reacting ethylene oxide with a cold aqueous solution of aluminum chloride and phosphoric acid. The aluminum phosphate gels are next calcined and used as catalysts or supports in a hydrocarbon cracking process.

U.S. Pat. No. 3,904,550, entitled "Hydrocarbon Conversion Catalyst Comprising Alumina and Aluminum Phosphate", issued to Pine, on Sept. 9, 1975, discloses a catalyst support consisting of alumina and aluminum phosphate which is prepared by reacting an aluminum alkoxide with an aqueous solution containing phosphate ions. The product is recovered and calcinated, which in turn can be combined with various known catalyst components, for example, zeolites, to produce a hydrocarbon cracking or desulfurization and denitrogenation catalyst. It is to be noted that the above-cited references fail to appreciate a catalyst system comprising zeolite composited with an alumina-aluminum phosphate-silica matrix, as specifically defined herein, to increase gasoline production and quality in a hydrocarbon cracking process.

SUMMARY OF THE INVENTION

We have discovered a catalyst for increasing the gasoline yield and quality in a petroleum cracking reaction under catalytic cracking conditions comprising an alumina-aluminum phosphate-silica matrix characterized, after calcination at 500° C. for 16 hours, as amorphous having an average pore radius of from about 10 Å to about 200 Å, preferably from about 75 Å to about 150 Å; a surface area ranging from about 50 m$^2$/g to about 300 m$^2$/g, preferably from about 125 m$^2$/g to about 275 m$^2$/g; and a pore volume of from about 0.1 cc/g to about 1.2 cc/g; preferably from about 0.6 cc/g to about 1.0 cc/g and wherein the alumina-aluminum phosphate-silica matrix has a molar ratio range of from about 15:80:5 to about 60:10:30, especially from about 25:65:10 to about 50:30:20; and wherein said matrix retains at least 70% of its surface area when the matrix is additionally calcined at a temperature up to about 900° C. for about 16 hours, said matrix being composited with from about 5 to about 50 weight percent, especially from about 5 to about 35 weight percent, of a zeolite having cracking activity, particularly a REY-zeolite.

DESCRIPTION OF THE INVENTION

This invention relates to an improved catalyst for increasing the gasoline yield and quality in a catalytic cracking process of either light or heavy feedstocks which can contain a high metals content. Particularly, the catalyst comprises an alumina-aluminum phosphate-silica matrix composited with a zeolite having cracking activity.

The matrix with which the zeolite is composited is preferably an alumina-aluminum phosphate-silica of the general formula:

$Al_2O_3$—$AlPO_4$—$SiO_2$

Normally the alumina-aluminum phosphate-silica constituents are in a mole percent ratio range of from about 15:80:5 to about 60:10:30, preferably from about 25:65:10 to about 50:30:20. The above alumina-aluminum phosphate-silica matrix can be prepared according to techniques and methods normally used in the art. One such method is set forth, for example, in U.S. Pat. No. 3,904,550 issued to Pine, the disclosure of which is incorporated herein by reference. Another method is set forth in U.S. Pat. No. 4,080,311 issued to Kehl, which discloses thermally-stable composite precipitates containing alumina and aluminum phosphate.

Typical zeolites or molecular sieves having cracking activity and which can be suitably dispersed in a matrix for use as a cracking catalyst are well known in the art. The zeolites are crystalline aluminosilicates, both natural and synthetic, which possess three-dimensional structures containing a large number of uniform openings or cavities, interconnected by smaller, relatively uniform holes or channels. The effective pore size is suitably between 4 Å and 15 Å in diameter. In their hydrated form, they may be represented by the formula

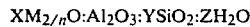
$XM_{2/n}O:Al_2O_3:YSiO_2:ZH_2O$ wherein M represents at least one metal cation of valence n, X represents the moles of metal cation, Y the moles of $SiO_2$ and Z the moles of $H_2O$. The cation can be any or more of a number of metal ions depending upon whether the zeolite is synthetic or naturally-occurring. The naturally-occurring molecular sieve zeolites are usually found in the sodium form, an alkaline earth metal form, or mixed forms. The synthetic molecular sieves are normally in their sodium form; however, it should be understood that other alkali metal compounds can be substituted therefor.

Zeolites which can be employed in accordance with this invention include gmelinite, chabazite, dachiardite, clinoptilolite, faujasite, heulandite, analcite, levynite, erionite, sodalite, cancrinite, napheline, lazurite, scolecite, natrolite, offretite, mesolite, mordenite, brewsterite, ferrierite, and the like. The faujasites are preferred. Suitable synthetic zeolites which can be treated in accordance with this invention include zeolites X, Y, A, L, ZK-4, B, E, F, HJ, M, Q, T, W, Z, alpha and beta, ZSM-types and omega. The term "zeolites" as used herein contemplates not only aluminosilicates but substances in which the aluminum is replaced by gallium and substances in which the silicon is replaced by germanium. The preferred zeolites for this invention are the synthetic faujasites of the types Y and X or mixtures thereof; however, the Y-type zeolites are superior when used herein.

The crystalline aluminosilicate zeolites, such as synthetic faujasite, will under normal conditions, crystalize as regularly shaped, discrete particles of approximately one to ten microns in size, and, accordingly, this is the size range normally used in commercial catalysts. Preferably the particle size of the zeolites is from 0.5 to 10 microns and more preferably is from 1 to 2 microns or less. Crystalline zeolites exhibit both an interior and an exterior surface area, with the largest portion of the total surface area being internal. Blockage of the internal channels by, for example, coke formation and contamination by metals poisoning will greatly reduce the total surface area. Therefore, to minimize the effect of contamination and pore blockage, crystals larger than the normal size cited above are preferably not used in the catalysts of this invention.

It is also well known in the art that to obtain good cracking activity the zeolites have to be in a proper form. In most cases this involves reducing the alkali metal content of the zeolite to as low a level as possible. Further, a high alkali metal content reduces the thermal structural stability, and the effective lifetime of the catalyst will be impaired as a consequence thereof. Procedures for removing alkali metals and putting the zeolite in the proper form are well known in the art as described, for example, in U.S. Pat. No. 3,537,816. These procedures for activating and stabilizing the zeolite generally consist of the substitution of various cations for the alkali metal cations by an exchange procedure. For the cracking operations described herein, preferable cations are hydrogen, ammonium, rare earth and mixtures thereof, with particular preference being accorded rare earth.

The term REY-zeolites as defined herein is the Y-type zeolite that has undergone an ion exchange reaction with rare earth metal ions. A wide variety of rare earth compounds can be ion exchanged but chlorides, nitrates and sulfates are preferred. The rare earth metal salts employed can either be the salt of a single rare earth metal or mixtures of rare earth metals selected from the group consisting essentially of lanthanum, cerium, neodymium and praseodymium with minor amounts of samarium, gadolinium and yttrium. The specific mixture referred to in the examples herein contain the chlorides of the rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, and other rare earth oxides 0.8% by weight.

The zeolite is composited with the alumina-aluminum phosphate-silica matrix from about 5 to about 50 weight percent, preferably from about 5 to about 35 weight percent, based on the weight of said matrix. The method of forming the final composited catalyst does not form a part of this invention, and any method well known to those skilled in the art is acceptable. For example, finely-divided zeolite can be admixed with finely-divided alumina-aluminum phosphate-silica, and the mixture spray dried using conventional methods to form the final catalyst.

It is to be noted that the above matrix is characterized, after calcination at 500° C. for 16 hours, as amorphous having an average pore radius of from 10 Å to about 200 Å, preferably from about 75 Å to about 150 Å, a surface area ranging from about 50 m²/g to about 300 m²/g, preferably from about 125 m²/g to about 275 m²/g and a pore volume of from about 0.1 cc/g to about 1.2 cc/g, preferably from about 0.6 cc/g to about 1.0 cc/g and wherein said matrix retains at least 70% of its surface area when the matrix is additionally calcined at a temperature up to about 900° C. for about 16 hours. The matrix results in a final catalyst which has excellent attrition properties, i.e., an attrition index of about 10 or less.

Typical feedstocks that can be treated with the novel catalyst herein include light or heavy gas oils, light fractions of crude oil, heavy fractions of crude oil, or the like. Any type reaction vessel can be used which is normally used in the art. For example, U.S. Pat. No. 3,944,482 to Mitchell et al sets forth a suitable reaction vessel, reaction conditions, and process therefor, the teachings of which are incorporated herein by reference.

The weight ratio of catalyst to hydrocarbon feedstock is from about 4:1 to about 12:1, preferably from about 6:1 to about 10:1. The fresh hydrocarbon feedstock is generally preheated to a temperature of from about 316° C. to about 371° C., but is held below the vaporization point of said hydrocarbon feedstock. Additional heat required to achieve the desired reactor temperature is imparted to the reaction mixture by hot, regenerated catalyst.

The reactor linear velocity should not be sufficiently high to induce turbulence or excessive backmixing; however, the reactor linear velocity must be sufficiently high so that substantially no catalyst accumulation or build up occurs in the reactor because such accumulation leads to backmixing.

Avoiding a catalyst build up in the reactor results in a very low catalyst inventory in the reactor, which results in a high space velocity. It is to be noted that conditions such as reactor size, etc., will determine the space velocity of the process. However, the space velocity herein is from about 35 to about 500 weight of hydrocarbon feedstock per hour per weight of catalyst, especially from about 50 to about 300 weight of hydrocarbon feedstock per hour per weight of catalyst. It is to be noted that the above conditions and description of operation are for a preferred fluid bed riser cracking operation.

The zeolite riser cracking conditions and system (known as FCC or fluid catalytic cracking) suitable for use herein are described in greater detail in U.S. Pat. No. 3,617,512, the disclosure of which is incorporated herein by reference. However, the older conventional fluid bed operation or a fixed-bed operation can also be used.

We have discovered that an alumina-aluminum phosphate-silica matrix, as described and defined herein, has a low intrinsic cracking activity, interacts synergistically with a zeolite, particularly a REY-zeolite, as herein described and defined, to produce a cracking catalyst of high activity giving superior selectivity for gasoline production and quality.

The hydrocarbon feedstock used herein was a Kuwait gas oil having a boiling range of from about 260° C. to about 426° C. Inspections of this Kuwait gas oil are shown in Table I below.

TABLE I

| KUWAIT GAS OIL INSPECTIONS | |
| --- | --- |
| Stock Identification | MAT Feedstocks |
| Inspections: | |
| Gravity, API, D-287 | 23.5 |
| Viscosity, SUS D2161, 130° F. | 94.7 |
| Viscosity, SUS D2161, 150° F. | 70.5 |
| Viscosity, SUS D2161, 210° F. | 50.8 |
| Pour Point, D97, °F. | +80 |
| Nitrogen, wt % | 0.074 |
| Sulfur, wt % | 2.76 |
| Carbon, Res., D524, wt % | 0.23 |
| Bromine No., D1159 | 5.71 |
| Aniline Point, °F. | 176.5 |
| Nickel, ppm | <0.1 |
| Vanadium, ppm | <0.1 |
| Distillation, D1160 at 760 mm | |
| End Point, °C. | 426 |
| 5 Pct. Cond. | 263 |
| Approx. Hydrocarbon Type Analysis: Vol % | |
| Carbon as Aromatics | 23.1 |
| Carbon as Naphthenes | 10.5 |
| Carbon as Paraffins | 66.3 |

DESCRIPTION OF THE PREFERRED EMBODIMENTS

EXAMPLE I

An alumina-aluminum phosphate-silica matrix was prepared according to the following procedure:

A first mixture was prepared by adding to 4 liters of water, 750.3 grams of aluminum nitrate and 115.2 grams of 85% phosphoric acid. To the resulting mixture was added 1207 grams of silicic acid at 1.59% $SiO_2$ (19.2 grams $SiO_2$).

A second mixture was prepared by diluting 550 ml. of 58% ammonium hydroxide with 550 ml. of water. The two solutions, one containing the silicic acid mixture and the other containing the ammonium hydroxide mixture were added with agitation to 2.5 liters of water at relative rates, so as to maintain the solution pH at 8.0. The mixture was agitated for an additional ½ hour after completion of the above addition. The resulting mixture was filtered-washed with 2 liters of water and dried.

The above alumina-aluminum phosphate-silica matrix, after calcination, is characterized by an average surface area of 193 m²/g, an average pore radius of 99° A and an average pore volume of 0.96 cc/g. It is to be noted that the large pore radius, of the above matrix, is highly beneficial for enhancing metals tolerance in the completed catalyst. The silica in the above matrix serves as a binding agent and, additionally, enhances the catalyst acidity and thus its cracking activity. The above matrix can be slurried with a zeolite having cracking activity, for example, a REY-zeolite, as herein described, to produce the desired catalyst.

EXAMPLE II

A representative REY-zeolite was prepared according to the following procedure:

Into a 4-liter, 3-necked flask equipped with a mechanical stirrer, a water-cooled condenser and thermometer were added 2400 ml. of water heated to 80° C., with stirring. To the water was added 800 grams of sodium Y zeolite and 564 grams rare earth chloride mixture comprising 48% cerium, 24% lanthanum, 5% praseodymium, 17% neodymium, 3% samarium, 2% gadolinium and 0.8% other rare earth compounds. It is to be noted that all percent are by weight. The temperature was maintained at 80° C. for two hours with continued stirring and the reaction mixture was then filtered. The filtered REY-zeolite was reslurried with 2400 ml. of water and heated to a temperature of 80° C. Next, an additional 564 grams of the above rare earth chloride mixture was added to the solution. The temperature was maintained at 80° C. for two hours with stirring. The resulting REY-zeolite was filtered and washed with eight 1-liter batches of water.

The REY-zeolite was calcined at 538° C. for 10 hours, slurried with 2400 ml. of water and heated to 80° C. The procedure set forth above for the addition of the rare earth chloride mixture to the Y-type zeolite was repeated two additional times and the final reaction product was filtered and washed with eight 1-liter batches of water.

Next, the finished matrix-zeolite catalyst was prepared by slurring the matrix of Example I with a portion of the REY-zeolite produced above. The slurry was then spray dried and calcined for 10 hours at 500° C. to produce the desired catalyst.

EXAMPLES III TO VIII

In Examples III to VIII a comparison was made of the following: silica-alumina, silica-alumina combined with 15% REY-zeolite prepared in Example II, the alumina-aluminum phosphate-silica matrix prepared in Example I, the alumina-aluminum phosphate-silica matrix prepared in Example I combined with 15% of REY-zeolite prepared as in Example II, a commercial version of the latter catalyst and Filtrol 75F. In Example III the silica alumina was composed of 75 weight percent silica and 25 weight percent alumina and in Examples V, VI and VII, the molar ratio of the alumina, aluminum phosphate-silica was 27.4:55:17.6. These materials were evaluated using a microactivity test (MAT) unit similar to the Standard Davison MAT (see Ciapetta, F. C. and Handerson, D. S. "Oil and Gas Journal", 65,88, 1967). Catalyst samples were tested at 482° C., 15 weight hourly space velocity; 80 seconds catalyst contact time and a catalyst to oil ratio of 2.9. The charge stock was a Kuwait gas oil having a boiling range of from about 260° C. to about 426° C. (see Table I for inspection). The results are set forth in Table II below.

TABLE II

| | MICROACTIVITY TEST DATA | | | | | |
|---|---|---|---|---|---|---|
| | III | IV | V | VI | VII | VIII |
| | | Silica-Alumina | | Alumina-Aluminum Phosphate-Silica+ 15% Commercial | | |
| Example Catalyst | Silica-Alumina | 15% + REY-Zeolite of Ex.II | Alumina-Aluminum Phosphate-Silica | REY-Zeolite of Ex. II | Version of Ex. VI | Filtrol 75F[1] |
| Conversion Vol % ff[2] | 48.9 | 82.7 | 26.0 | 78.9 | 80.5 | 70.6 |
| C$_5$ + gasoline Vol % ff | 29.3 | 54.4 | 18.0 | 55.3 | 57.2 | 47.7 |
| % selectivity to gasoline | 59.9 | 65.8 | 69.2 | 70.1 | 71.0 | 67.6 |
| BTX content[3] wt % ff | — | 5.9 | — | 7.0 | 7.0 | 5.5 |
| Carbon, wt % ff | 2.5 | 5.0 | 2.7 | 4.7 | 2.7 | 3.5 |
| Hydrogen, wt % ff | 0.05 | 0.05 | 0.22 | 0.05 | 0.04 | 0.03 |

[1]Filtrol 75F = A catalyst marketed commercially by the Filtrol Corporation, located in Los Angeles, Ca., which is believed to contain 15% zeolite
[2]ff = Fresh feed
[3]BTX content = Benzene, toluene and xylenes content It is to be noted that the catalysts in Examples VI and VII exhibited superior conversion of the feedstock as well as selectivity to gasoline production and BTX content.

EXAMPLE IX

A cracking catalyst was prepared according to the following procedure: to a 5-liter, 3-necked flask, equipped with a stirrer, condenser and thermometer was added 1157 grams of aluminum secondary butoxide. A solution was prepared by mixing 1667 ml. of isopropyl alcohol, 290 grams of phosphoric acid and 60 cc. of water. This solution was added to the 5-liter flask over a period of 5 hours. The flask temperature was maintained at 80° C. during the addition period for the above solution. The contents of the flask were cooled, filtered and washed with isopropyl alcohol. To 685 grams of this filter cake (containing 219 grams of solids) dispersed in 100 grams of water were added 93.9 grams of ethyl orthosilicate which was dispersed in 120 ml. of ethanol. To this mixture was added 91.5 grams (47.5 wt. % solids) REY-zeolite, as described in Example II, and 1200 cc. of water to adjust the solids content to 10.4 weight percent. The resulting slurry was spray dried and calcined for 10 hours at 500° C. to produce the desired catalyst.

EXAMPLE X

A REY-zeolite alumina-aluminum phosphate-silica cracking catalyst containing 15 wt. % REY-zeolite, was prepared by adding 500 grams of aluminum chloride, 930 cc. of water and 164 grams of ethyl orthosilicate to a 4-liter beaker. Next, 119 grams of phosphoric acid was slowly added to this solution over a 5-minute time period. This solution was then cooled to approximately 0° C. and ethylene oxide gas was bubbled through the solution until the solution gel point was obtained. The gel was then filtered, followed by an isopropyl alcohol and water wash at an isopropyl alcohol to water ratio of 1:1 respectively.

The solids content of the filter cake was determined to be 9.3%. To 2000 grams of this filter cake (containing 187 grams of solids) was added 69.5 grams (47.5 wt. % solids) REY-zeolite, as defined in Example II, dispersed in water to give a final composition containing 15% by weight REY-zeolite. The resulting catalyst was spray dried and calcined at 500° C. for 10 hours.

EXAMPLES XI TO XIII

The cracking catalysts were evaluated according to the procedure of Examples III to VIII with the following results:

TABLE III

| | CATALYST MAT[1] ACTIVITY DATA | | |
|---|---|---|---|
| Example | XI | XII | XIII |
| Catalyst Description | Catalyst of Ex. II | Catalyst of Ex. IX | Catalyst of Ex. X |
| Temperature °F. | 900 | 900 | 900 |
| Conversion, vol % ff[2] | 78.9 | 76.2 | 71.3 |
| C$_5$ + gasoline, vol % ff | 55.3 | 51.9 | 46.4 |
| BTX[3], wt % ff | 7.0 | 5.3 | 5.5 |
| Carbon, wt % ff | 4.7 | 3.5 | 3.7 |
| Hydrogen, wt % ff | 0.05 | 0.09 | 0.07 |
| Selectivity to Gasoline, % | 70.1 | 68.1 | 65.1 |
| Selectivity to BTX, % | 8.9 | 7.0 | 7.7 |

[1] MAT = Micro Activity Test Unit
[2] ff = Fresh Feed
[3] BTX = Benzene, toluene and xylenes The catalysts of this invention exhibited superior conversion of the feedstock as well as selectivity to gasoline production and BTX content.

EXAMPLES XIV TO XVIII

The catalyst of Example II was examined for metals tolerance by synthetically contaminating said cracking catalyst with several concentration levels of nickel and vanadium. The series was prepared by impregnating the catalyst with nickel and vanadium naphthenates to metals levels of 1200, 1900, 3000 and 5000 parts per million (ppm) nickel equivalents. Parts per million nickel equivalents herein means the total ppm of nickel plus one-fifth of the total ppm of vanadium by weight deposited on the catalyst. The test procedure of Examples III to VIII was followed with the following results:

TABLE IV

| | CATALYST METALS TOLERANCE - MAT[1] DATA | | | | |
|---|---|---|---|---|---|
| EXAMPLE | XIV | XV | XVI | XVII | XVIII |
| Catalyst Description | Cat. of Ex. II | Cat. of Ex. II | Cat. of Ex. II | Cat. of Ex. II | Cat. of Ex. II |
| Temperature, °F. | 900 | 900 | 900 | 900 | 900 |
| Metals Concentration, PPM[2] | 0 | 1200 | 1900 | 3000 | 5000 |
| Conversion, Vol % ff[3] | 78.9 | 73.5 | 70.5 | 65.8 | 62.1 |
| C$_5$ + Gasoline, Vol % ff | 55.3 | 48.0 | 45.0 | 40.4 | 37.9 |
| Carbon, wt % ff | 4.7 | 6.4 | 7.5 | 7.7 | 7.7 |
| Hydrogen, wt % ff | 0.05 | 0.60 | 0.77 | 0.84 | 0.89 |

[1] MAT = Micro Activity Test Unit
[2] Expressed as nickel equivalents (total PPM of nickel plus one-fifth of the total PPM of vanadium by weight)
[3] ff = Fresh Feed As can readily be determined from the above data, the catalyst compositions of this invention maintain high conversion and gasoline yields as well as produce acceptable levels of coke and hydrogen when contaminated with the herein described concentration of metals (i.e., they possess superior metals tolerance).

EXAMPLES XIX to XXIII

The catalyst of Example IX was examined according to the procedure of Examples XIV to XVII. The results are tabulated in Table V below.

TABLE V

| | CATALYST METALS TOLERANCE MAT[1] DATA | | | | |
|---|---|---|---|---|---|
| EXAMPLE | XIX | XX | XXI | XXII | XXIII |
| Catalyst Description | Cat. of Ex. IX | Cat. of Ex. IX | Cat. of Ex. IX | Cat. of Ex. IX | Cat. of Ex. IX |
| Temperature, °F. | 900 | 900 | 900 | 900 | 900 |
| Metals Concentration, PPM [2] | 0 | 1200 | 1900 | 3000 | 5000 |
| Conversion, vol. % ff[3] | 76.2 | 63.1 | 60.0 | 55.5 | 49.6 |
| C$_5$ + Gasoline, vol. % ff | 51.9 | 37.0 | 34.1 | 27.1 | 24.5 |
| Carbon, wt % ff | 3.5 | 6.2 | 7.5 | 8.2 | 8.5 |
| Hydrogen, wt % ff | 0.09 | 0.94 | 1.10 | 1.20 | 1.24 |

[1] MAT = Micro Activity Test Unit
[2] Expressed as nickel equivalents (total PPM of nickel plus one-fifth of the total PPM of vanadium by weight)
[3] ff = Fresh Feed As can readily be seen from the above data the catalyst compositions of this invention are superior in its cracking activity; selective to gasoline yield and, additionally, exhibits excellent metals tolerance, attrition and thermal stability properties.

Obviously, many modifications and variations of the invention, as hereinabove set forth, can be made without departing from the spirit and scope thereof, and therefore only such limitations should be imposed as are indicated in the appended claims.

We claim:

1. A catalyst for increasing the gasoline yield and quality in a petroleum cracking reaction under catalytic cracking conditions comprising an alumina-aluminum phosphate-silica matrix characterized after calcination at 500° C. for 16 hours as amorphous, and having an average pore radius of from about 10 Å to about 200 Å; a surface area ranging from about 50 m²/g to about 300 m²/g; a pore volume of from about 0.1 cc/g to about 1.2 cc/g; and wherein the alumina-aluminum phosphate-silica matrix has a mole percent ratio of from about 15:80:5 to about 60:10:30 and wherein said matrix retains at least 70% of its surface area when the matrix is additionally calcined at a temperature up to about 900° C. for about 16 hours; said matrix being composited with from about 5 to about 50 weight percent of a zeolite having cracking activity.

2. The composition according to claim 1 wherein the alumina-aluminum phosphate-silica matrix has an average pore radius of from about 75 Å to about 150 Å.

3. The composition of claim 1 wherein the alumina-aluminum phosphate-silica matrix has a surface area of from about 125 m²/g to about 275 m²/g.

4. The composition according to claim 1 wherein the alumina-aluminum phosphate-silica matrix has a pore volume of from about 0.6 cc/g to about 1.0 cc/g.

5. The composition of claim 1 wherein the alumina-aluminum phosphate-silica matrix has a mole percent ratio range of from about 25:65:10 to about 50:30:20.

6. The composition of claim 1 wherein said zeolite is a REY-zeolite.

7. The composition according to claim 6 wherein from about 5 to about 35 weight percent REY-zeolite is composited with the alumina-aluminum phosphate-silica matrix.

8. The composition of claim 6 wherein the REY-zeolite contains a rare earth metal selected from the group consisting of cerium, lanthanum, praseodymium, neodymium, illinium, samarium, europium, gadolinium, terbium, dysprosium, holmium, erbium, thulium, scandium, yttrium, lutecium and mixtures thereof.

* * * * *

UNITED STATES PATENT OFFICE
CERTIFICATE OF CORRECTION

Patent No. 4,228,036  Dated October 14, 1980

Inventor(s) H. E. Swift, J.J. Stanulonis and E.H. Reynolds

It is certified that error appears in the above-identified patent and that said Letters Patent are hereby corrected as shown below:

Table II, Example IV, --Silica-Alumina 15% + REY-Zeolite of Ex. II--  should read --Silica-Alumina +15% REY-Zeolite of Ex. II--

Table II, Example VI, --Alumina-Aluminum Phosphate-Silica + 15% Commercial REY-Zeolite of Ex. II-  should read --Alumina-Aluminum Phosphate-Silica + 15% REY-Zeolite of Ex. II--

Table II, Example VII, --Version of Ex. VI--  should read

--Commercial Version of Ex. VI--.

*Signed and Sealed this*

*Fifth* Day of *May 1981*

[SEAL]

Attest:

RENE D. TEGTMEYER

*Attesting Officer*  *Acting Commissioner of Patents and Trademarks*